Nov. 2, 1943.  Z. LITTMAN  2,333,482
AIRPLANE WING, AILERON, AND AIRPLANE RUDDER
Filed Sept. 10, 1941  2 Sheets-Sheet 1
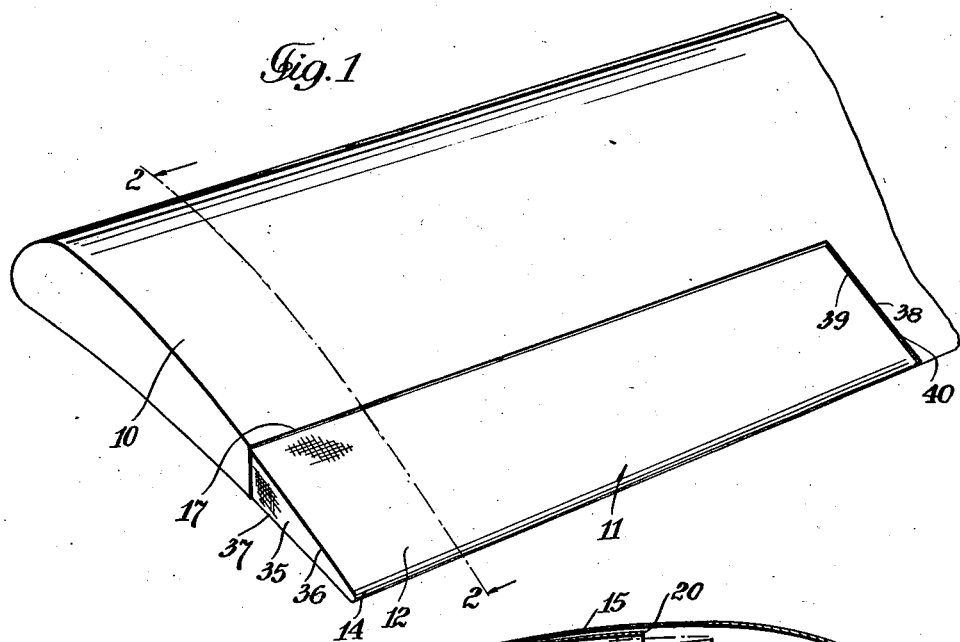
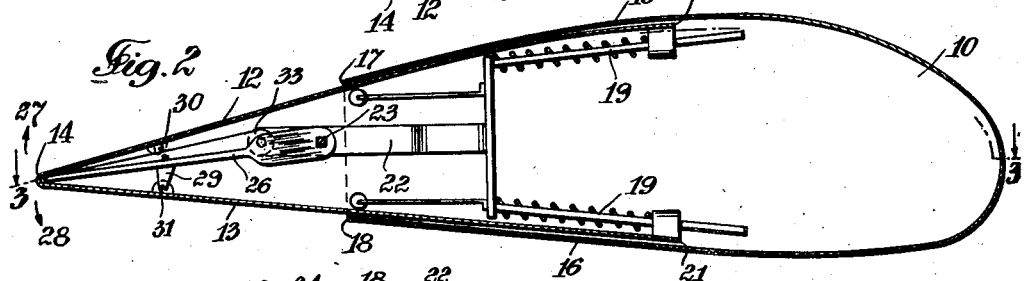
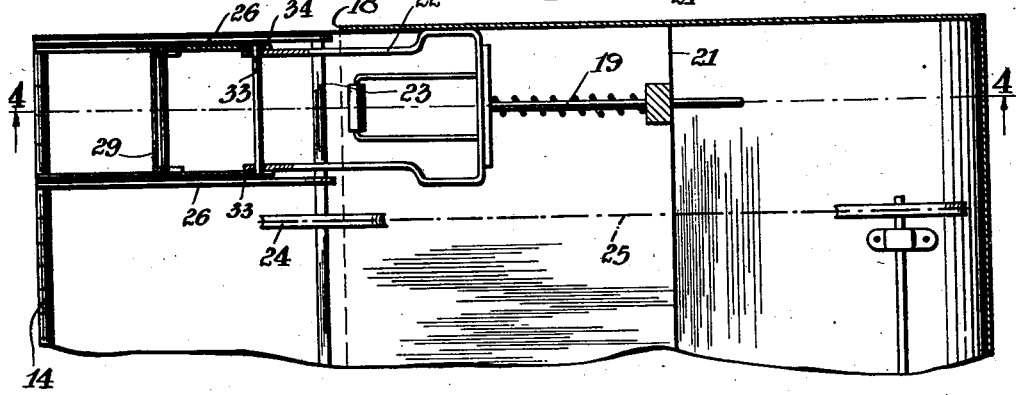
INVENTOR:
Zeno Littman
BY
his agent

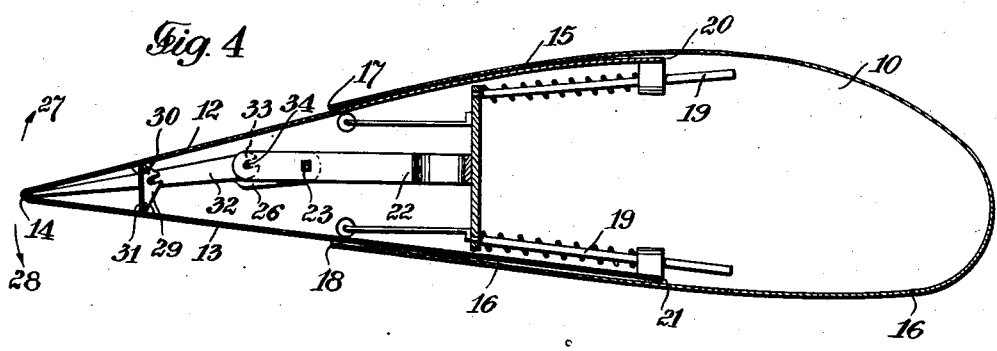
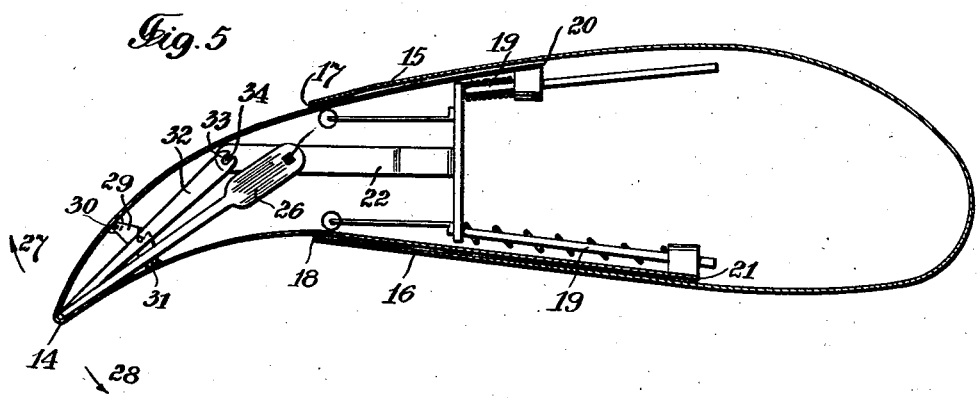

Patented Nov. 2, 1943

2,333,482

UNITED STATES PATENT OFFICE 2,333,482

AIRPLANE WING, AILERON, AND AIRPLANE RUDDER

Zeno Littman, New York, N. Y.

Application September 10, 1941, Serial No. 410,322

6 Claims. (Cl. 244—90)

My present invention relates to airplanes and, more particularly, to airplane wings provided with ailerons turnably attached to the trailing edge of these wings.

All known types of ailerons are built as separate units attached by hinges or like means to the rear part of an airplane wing; the gap between the wing and the aileron always results in a certain amount of drag.

It is the main object of my present invention as far as possible to avoid the drag caused by gaps between the wing and the aileron.

It is a further object of my invention to provide an aileron, the skin of which forms during use a substantially uninterrupted smooth surface with the surfaces of the wing.

Another object of my invention consists of an aileron having a variable profile, i. e., an aileron the outline of which can be varied by the pilot as required.

Still a further object of my present invention consists of a new airplane wing having a variable profile and thereby making it possible to omit separate ailerons, and use the turnable rear portions of the wings for steering purposes.

Still another object of my present invention consists of rudders having a variable profile.

With the above objects in view, I herewith propose to combine with an airplane wing an aileron turnably attached to the trailing edge of this wing and to provide this aileron with a flexible outer skin structure and turnable controlling means inside the same; these controlling means have to be arranged to support this skin structure in such a manner that during turning of the aileron its flexible skin structure forms a substantially uninterrupted smooth surface with the wing surfaces. The skin structure is preferably covered with an elastic sheet material, e. g. an elastic and flexible metal sheet. If the aileron has a relatively small outer surface, it is also possible to use as skin structure a flexible and elastic sheet metal plate of the required shape.

In order to avoid gaps between the airplane wing and my new aileron, the upper and lower flexible skin structures of the same extend inside the wing and are positioned adjacent to the corresponding wing surfaces gliding along the same when the aileron is turned.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of an airplane wing equipped with an aileron built in accordance with my present invention;

Fig. 2 is a cross-section of the wing and the aileron shown in Fig. 1 along line 2—2;

Fig. 3 is a cross-section of the wing and the aileron shown in Figs. 1 and 2 along lines 3—3 of Fig. 2;

Fig. 4 is a cross-section of the aileron shown in Figs. 1 to 3 along line 4—4 of Fig. 3; and Fig. 5 is a cross-section of the aileron shown in Figs. 1 to 4, in operative downward-turned position.

As shown in the drawings, at its trailing edge near the wingtip, the airplane wing 10 is provided with a recess into which is mounted the aileron 11.

This aileron is provided with upper and lower skin structures 12 and 13 consisting in the embodiment shown in the drawings of flexible, elastic, metallic sheets connected to each other at the rear edge of the aileron by hinges 14. The metallic skin sheets partly extend into wing 10, lying as indicated by numeral 15 and 16 adjacent to the inner surface of the skin structure of the wing. Thereby it is possible to avoid gaps between the edges 17 and 18 of wing 16 and the outer surface of the skin structures 12 and 13 of the aileron 11.

As shown in Figs. 2 to 5, I provide controlling means adapted to turn the rear edge of the aileron about a pivoting axis, thereby changing the profile of the aileron as needed. As the skin structure of the aileron is made of flexible and elastic material, it will bend along a curve forming a substantially continuous arc extending from the fixed wing surface to the rear edge of the aileron.

In order to insure a smooth surface of the flexible skin structures 12 and 13, I provide inside of the wing 10 spring mechanisms 19 adapted to push the edges 20 and 21 of these skin structures 12 and 13 in direction away from the rear edge of the aileron. This pushing force keeps the surfaces of the skin structure smooth, so that the same form a substantially uninterrupted surface with the wing. It should be noted that, with the same result, I may provide also other means which are adapted to keep the outer surfaces of the skin structures 12 and 13 under tension.

As shown in Figs. 2 to 4, the controlling means mentioned above consist of a bracket-like member 22 carrying the rotatable driving spindle 23 and adjusting members 26 secured to the same. This spindle may be turned by means of chain wheel 24 and chain 25. Each of the adjusting members 26 is at its one end rigidly secured to spindle 23 and at its other end hingedly attached to the hinges 14 at the rear end of the aileron.

By pulling chain 25, the chain wheel 24 and spindle 23 are turned; thereby also the adjusting members 26 are turned about spindle 23 and the rear edge of the aileron is forced to perform an upward and downward movement along an arc-shaped path in direction of arrows 27 or 28.

In some cases, it is unnecessary to provide separate means for holding the skin structures of the aileron apart from each other; this is especially the case if the aileron surfaces are small and the skin structure is made of relatively strong material.

In case the aileron has a greater operating surface, it will be necessary to provide distance members 29 connected to the skin structures 12 and 13 by hinges 30 and 31. These distance members 29 are cooperating with the fixed bracket 22 by means of slit and tongue connections, thus being guided during turning of the aileron. These slit and tongue connections consist of members 32 hingeably secured to the distance pieces 29 and cooperating with bracket 22 by means of pin 33 and slot 34.

It should be mentioned that, although I have shown in the drawings only one distance member, a series of such members connecting consecutive corresponding points of the skin structures may be provided for; in this case, it is necessary to provide also a series of consecutive connecting means between these distance pieces in order to synchronize their relative movements.

As shown in Fig. 1, the open end of the aileron may be covered by covering means made of flexible and stretchable material, e. g. a rubber sheet 35, fixed to the outer edges 36 and 37 of the upper and lower skin structures of the aileron. In the same way, it is also possible to provide protecting strips 38 made of rubber or like material between the inner edges 39 of the skin structures 12 and 13 and the corresponding edges 40 of the wing in order to avoid gaps between these parts of the wing and the aileron surfaces.

It should be stressed that my present invention is not intended to be limited to ailerons of the type shown in the above described preferred embodiment; the expression "aileron," as used throughout the specification and claims, comprises all types of wings, rudders, or parts of the same, which are adapted to perform a movement relative to the main body of an airplane. Thus, for instance, airplane wings constructed in accordance with my present invention have a variable profile and, consequently, may be used for the most different purposes. It is likewise possible to construct rudders with variable profiles and to adapt them thus for special uses.

It will be understood that each of the elements described above, or two or more together, may also find a useful application in other types of ailerons differing from the types described above.

While I have illustrated and described the invention as embodied in ailerons, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalency of the following claims.

What I claim as new and desire to secure by Letters Patent is:

1. In combination with an airplane wing, an aileron turnably attached to the trailing edge of said wing, said aileron being provided with flexible upper and lower skin structures made of elastic sheet material, said flexible skin structures being connected to each other at the rear edge of the aileron only, controlling means arranged inside said wing and said aileron, said controlling means turnably connecting only said rear edge portion of the aileron to a part of the wing structure, and slit and tongue connections between various points of said flexible skin structures and the wing structure, said connections being arranged in such a manner that said flexible skin structures form, when the aileron is turned, a substantially uninterrupted smooth surface with the wing surfaces.

2. In combination with an aileron of the type claimed in claim 1, means for forcing those edges of the flexible upper and lower skin structures of the aileron which are located inside of the wing in direction away from the rear edge of the aileron, thus keeping the outer surfaces of said flexible skin structures smooth and constantly in close contact with the corresponding rear edges of the wing surfaces.

3. In combination with an aileron of the type claimed in claim 1, a series of turnable adjusting means arranged inside said wing and said aileron, each of said adjusting means turnably connecting a point of the rear edge portion of said aileron to a spindle pivoted to the inner wing structure.

4. In combination with an aileron of the type claimed in claim 1, at least two spring members, each of said spring members fastened at its one end to a part of the inner wing structure and at its other end to a portion of one of the flexible skin structures of the aileron which is reaching into said wing, said spring members forcing the portions of said flexible covering skin structures which are located inside of the wing in a direction away from the rear edge of the aileron, thus keeping said outer surfaces of said flexible skin structures smooth and constantly in close contact with the corresponding rear edges of the wing surfaces.

5. In combination with an aileron of the type described, an inner wing structure, flexible skin structures covering the upper and lower aileron surfaces, distance pieces holding corresponding points of said flexible skin structures of the upper and lower aileron surfaces at a constant distance, and slit and tongue connections between said distance pieces and said inner wing structure, said connections arranged in such a manner that said upper and lower flexible covering skin structures of the aileron form, when the same is turned, substantially smooth and uninterrupted surfaces with the wing surfaces.

6. In combination with an aileron of the type described, an inner wing structure, flexible skin structures mounted on the upper and lower aileron surfaces, a series of distance pieces being turnably pivoted to corresponding points of the inner surface of said flexible skin structures mounted on the upper and lower aileron surfaces, thus holding these corresponding points of the upper and lower aileron surfaces at a constant distance from each other, and slit and tongue connections between said turnably pivoted distance pieces and said inner wing structure, said connections arranged in such a manner that the upper and lower flexible covering skin structures of the aileron form, when the same is turned, substantially smooth and uninterrupted surfaces with the wing surfaces.

ZENO LITTMAN.